Figures 1, 2:
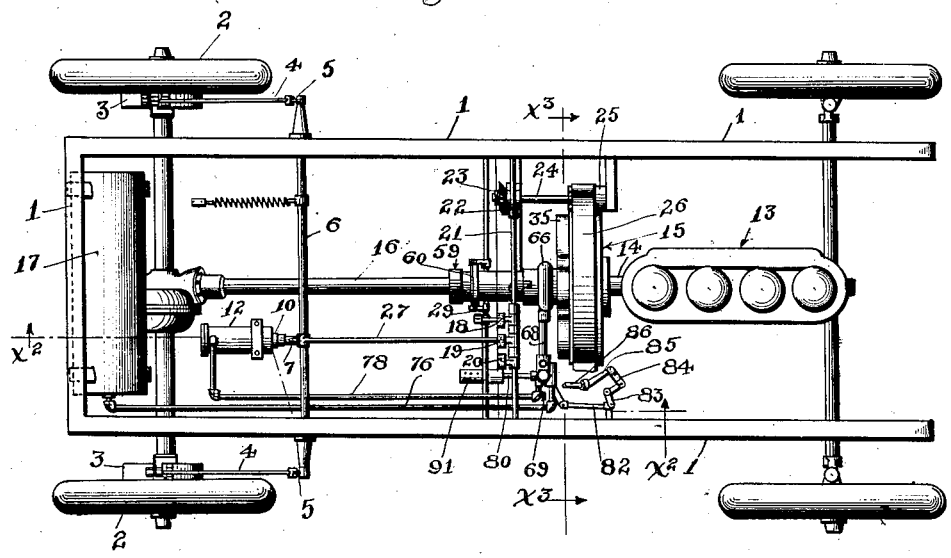

F. M. PRATHER.
POWER TRANSMITTER.
APPLICATION FILED APR. 30, 1912.

1,067,441.

Patented July 15, 1913.
3 SHEETS—SHEET 1.

Witnesses
Sully Russo.
Luts A. Alter.

Inventor
Frank M. Prather.
by Lyon & Hackley
attys.

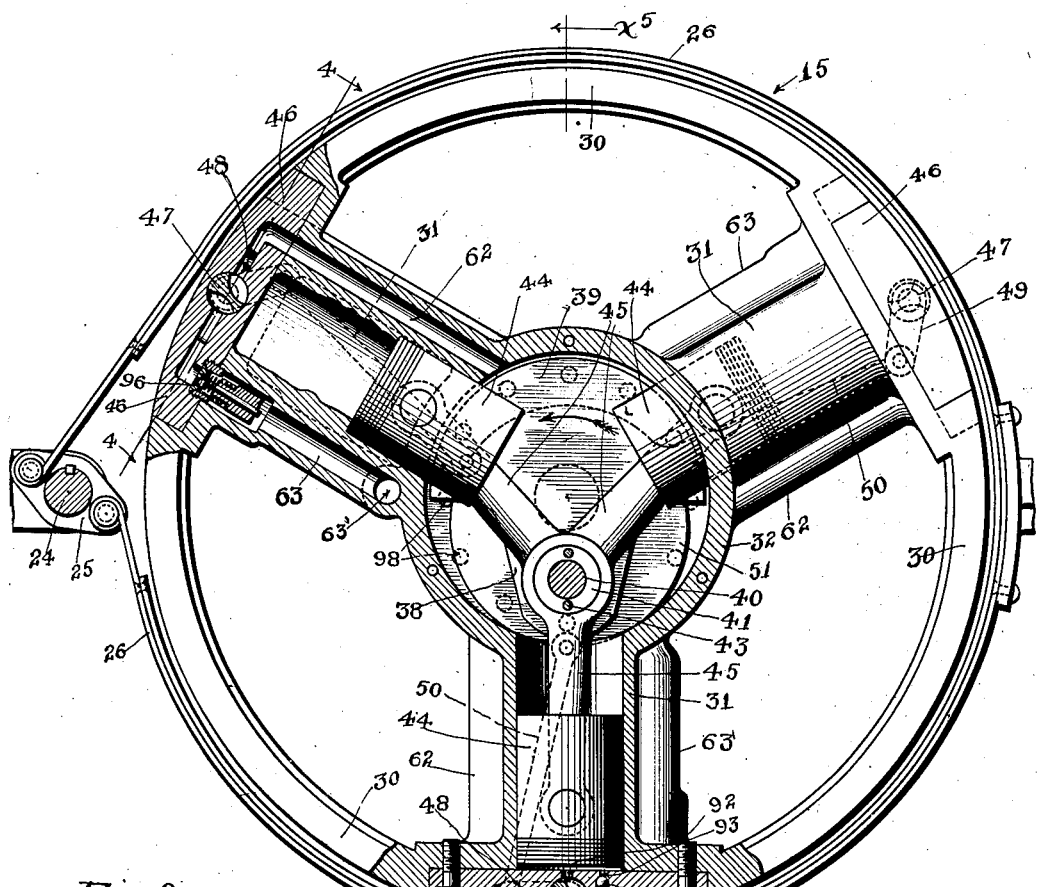

F. M. PRATHER.
POWER TRANSMITTER.
APPLICATION FILED APR. 30, 1912.
1,067,441.
Patented July 15, 1913.
3 SHEETS—SHEET 3.
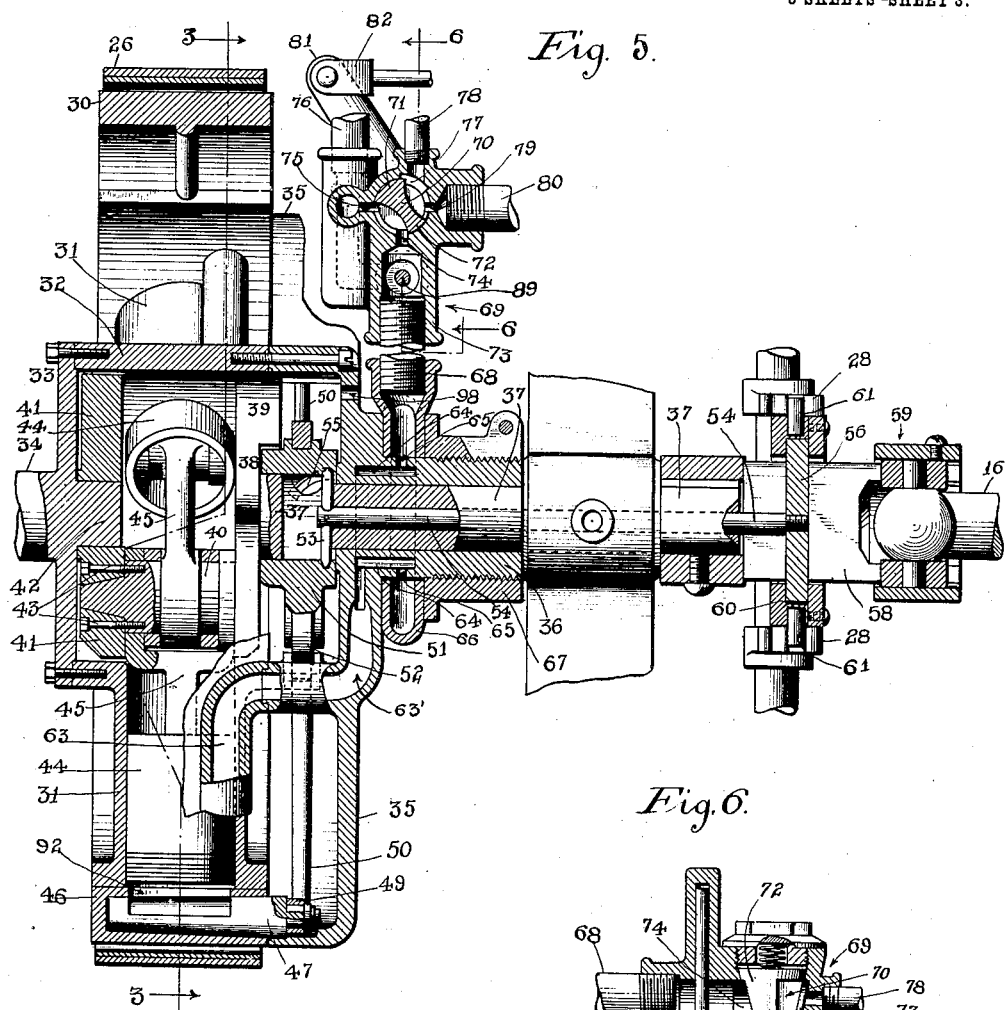

UNITED STATES PATENT OFFICE.

FRANK MONROE PRATHER, OF LOS ANGELES, CALIFORNIA.

POWER-TRANSMITTER.

1,067,441.  Specification of Letters Patent.  Patented July 15, 1913.

Original application filed April 12, 1911, Serial No. 620,692. Divided and this application filed April 30, 1912. Serial No. 694,282.

*To all whom it may concern:*

Be it known that I, FRANK M. PRATHER, a citizen of the United States, residing at Los Angeles, in the county of Los Angeles and State of California, have invented a new and useful Power-Transmitter, of which the following is a specification.

This application is a division of a former application of mine on power transmitter, filed April 12, 1911, Serial No. 620,692.

The present invention relates to a device which is operated by relative movement between the driving and driven shafts to compress air, the said device being capable of acting as a clutch to transmit power or as a compressor to compress air, or as a motor to utilize compressed air which had been compressed, and act to start the regular motor, and the invention includes valve means and air brakes coöperating with the foregoing elements.

Referring to the drawings: Figure 1 is a plan view of an automobile equipped with the mechanism forming my invention. Fig. 2 is a sectional view on line $x^2$—$x^2$ Fig. 1, the view being on an enlarged scale. Fig. 3 is a section on line $x^3$—$x^3$ Fig. 1 on an enlarged scale. Fig. 4 is a section on line 4—4 Fig. 3. Fig. 5 is a section on line $x^5$—$x^5$ Fig. 3. Fig. 6 is a section on line 6—6 Fig. 5. Fig. 7 is a perspective of the sliding element for operating the eccentric. Fig. 8 is a perspective on a reduced scale of the driven shaft. Fig. 9 is a sectional view through a check valve.

Referring to Fig. 1, 1 designates an automobile frame with driving wheels 2 and brakes 3 on the driving wheels connected by rods 4 with arms 5 projecting from a rock shaft 6. On the rock shaft 6 is an arm 7 with a pin 8 which engages in a slot 9 formed in a piston rod 10 which is operated by a piston 11 in a brake cylinder 12.

13 is the motor with driving shaft 14.

15 designates the pneumatic power transmitter, 16 the driven shaft and 17 the storage tank for compressed air.

18 designates a pedal for operating the reverse mechanism, 19 a pedal for operating the brakes 3, and 20 a pedal for operating a rock shaft 21 which carries a segmental bevel gear 22 meshing with a bevel gear 23 on a shaft 24, the shaft 24 having a double arm 25 to both ends of which is connected a brake band 26 which encircles the cylinder member 15 of the pneumatic power transmitter, as clearly shown in Fig. 3, so that when the pedal 20 is operated brake band 26 will prevent rotation of the cylinder member 15 of the pneumatic transmitter.

When the pedal 19 is operated it pushes the rod 27 rearwardly which moves arm 7 forwardly, pin 8 traveling freely forward in the slot 9 and in slotted arm 7, and shaft 6 is thus rocked which moves forward arms 5 and draws rods 4, thus operating brakes 3. When pedal 18 is operated it actuates a forked arm 28 through the medium of a link 29, and the forked arm 28 operates a reversing device which will be described.

The pneumatic power transmitter comprises in the present embodiment a fly-wheel 30 which is formed with three cylinders 31 and with a central circular crank chamber 32 to which is attached a disk 33 on the end of a driving shaft 34. Secured to the other side of the crank chamber 32 is a cap 35 which is formed with a hub 36 in which is mounted one end of the driven shaft 37, on the end of which is a crank 38 with counterbalance 39, the crank 38 being connected by a crank pin 40 with a crank 41 journaled on a boss 42 projecting from the end of the driving shaft 34 and also provided with a counterbalance, the crank 41 being detachably secured to the crank pin 40 by screws 43.

Sliding in the cylinders 31 are trunk pistons 44, each of which has a connecting rod 45 which is connected with the crank pin 40. Inserted in the fly-wheel 30 and flush therewith at the end of each cylinder is a plate 46, each of which has a rock valve 47 and is provided with a valve chamber 48, as clearly shown in Fig. 4, each valve 47 having an arm 49 which is connected with a rod 50. Mounted on the driven shaft 37 is an eccentric 51 and an eccentric strap 52 with which the rods 50 are pivotally connected, so that as the eccentric is operated by the shaft 37 the rock valves 47 will be oscillated through their connections with the eccentric. As in certain functions the valves 47 are to be reversed, I provide a mechanism for reversing the eccentric 51. This consists of a pin 53 in the end of a rod 54, the latter being slidable in the center of the driven shaft 37, the pin 53 engaging spiral grooves 55 formed in the hub of the eccentric 51, so that when the rod 54 is moved longitudinally, the pin 53 sliding in the grooves 55 will turn the eccentric 51 and reverse the position of the valves 47. The rod 54 is operated by disk 56, shown in detail in Fig. 7, to which the rod 54 is attached, the disk 56 having two openings 57 which slidably engage bars 58 of a universal joint 59 which prevents the disk 56 from turning with respect to the shaft 37. A grooved collar 60 engages the rim of the disk 56, and pins 61 which project into the grooved collar are engaged by arms 28 before referred to.

The crank chamber 32 is air-tight, thus forming an air chamber, and extending along the side of each cylinder 31 is an air passage, the inner end of which communicates with the interior of the crank chamber 32, the outer end of each air passage 62 communicating with the valve chamber 48. On the other side of each cylinder is an air passage 63, the inner end of which joins an air passage 63' formed in the cap 35, as clearly shown in Fig. 5, the passage 63' communicating with an annular chamber 64 formed in the cap 35 and having ports 65 which extend from the chamber 64 to a hollow ring 66 which encircles the hub 36, and the ring 66 is held in position by a collar 67 which is screwed on the hub 36.

Extending from the hollow ring 66 is a pipe 68 which, as clearly shown in Figs. 1 and 5, leads to a controlling valve designated in general 69. The controlling valve 69 contains a revoluble valve 70 with a wide face 71 and a narrow face 72. The valve casing 73 is provided with a port 74 leading to the pipe 68, a port 75 leading to pipe 76, a port 77 leading to a pipe 78 and a port 79 leading to a pipe 80. The valve 70 is operated by an arm 81 which is connected by a link 82 with a bell-crank lever 83 which in turn is connected by a link 84 with an arm 85 on the lower end of a rod 86 which extends along the steering column 87 and is operated by a lever 88 at its upper end, as shown in Fig. 2. Also in the casing 73 is a check valve 89, as shown in Fig. 6, which is normally closed by a spring 90, the latter closing communication between the pipe 76 and pipe 68. As shown in Fig. 1, the pipe 80 which leads to atmosphere is provided on its end with a perforated drum 91 which acts as a muffler for the escaping air, preventing any objectionable noise. The pipe 76 leads to the storage tank 17 and the pipe 78 leads to the brake cylinder 12.

In each plate 46 is a port 92 which leads from the valve 47 to the cylinder, and a port 93 is arranged between the cylinder and valve chamber 48 which is normally closed by a spring pressed ball valve 94. The function of the valve 94 is to prevent excessive compression in the cylinder which might be caused by careless operation of the device under certain conditions; thus with the car standing still, and the motor running fast, if the operator should shift the cylinder valves 47 into reverse position, and should be slow in doing it, as the thinner face of the valve passed across the port 93 it would completely close that port, and if the port remained closed for too long a period during the compression stroke of the piston, the air would be compressed to such a high point that breakage or accident would occur. This would be obviated, however, for when the pressure rose high enough to overcome the valve 94 the latter would open, thus placing port 93 in communication with valve chamber 48 and air would then pass from the cylinder through port 93 to valve chamber 48 and thence through passage 63 and other connections to the storage tank. It should be understood that in the normal operation of the device the valves 47 are shifted by the regular rotations of the eccentric at a time when the pistons are at the inner ends of their stroke, so that there is no excess of pressure within the cylinders at the time the valves 47 are closed.

As shown in Fig. 3, a check valve 96 is arranged between the passage 63 and valve chamber 48. This traps the air which is compressed by the cylinders and forced into the passages 63 and enables a higher compression to be produced than if the rock valves 47 were depended upon entirely. Each check valve 96 has a perforation 97 which is large enough to permit the requisite amount of air to pass reversely from valve passage 63 to valve chamber 48 when the air is to take the reverse circuit for performing certain operations. Air is allowed to enter the crank case 32 through perforations 98 in the cap 35, which perforations act as a muffler when the air passes in the opposite direction therethrough in exhausting the atmosphere.

The various functions which the device is capable of were fully set forth in the previous application referred to. The functions which are concerned more particularly with the present case are carried out as follows:— By moving the valve 70 to bring its face 72 to the left of port 74, as shown in Fig. 5, the port 74 will thereby be placed in communication with atmosphere through pipe 80 which will allow the car to coast freely, and by continuing this movement of the valve its wide face 71 will be moved to the right of port 77, thus placing port 75 in communication with port 77 which allows air from the storage tank to pass through the pipe 78 to the brake cylinder 12 which moves the piston 11 forward and operates the brakes 3. Then by turning the valve 70 back slightly, or enough to shut off the air from the storage tank, the brake cylinder will be placed in communication with the atmosphere as ports 77 will then be in communication with port 79 and air from the brake cylinder will thus pass to atmosphere through these ports and pipe 80, which will cause the brake 3 to be released.

It is often desirable to supplement the brake effect produced by the regular brakes of the car, or to check the movement of the car without using the regular brakes, and to thereby save wear on the latter, this being particularly desirable when descending a very steep or long grade, and this may be accomplished by applying the band brake 26, not to merely frictionally guard the rotation of the cylinders, but to actually stop them, thus killing the engine, and to then operate the reverse lever to shift the eccentric 51. Then by moving the controlling lever 70 to clutching position, that is, with its face 72 closing the port 74, as the cylinders are held stationary and the car is moving ahead, the pistons will be reciprocated in the stationary cylinders, thus compressing the air in a column against the closed valve 70. It is apparent, however, that the compression of air would soon be so great as to positively lock the pistons against further movement and thus stop the car altogether if the valve 70 were not operated occasionally to permit some air to escape to atmosphere through pipe 80 or preferably by adjusting the valve 70 to a point such that the compression will be sufficient to retard the car to the speed desired. If the reverse lever was not operated as above mentioned, the circuit of air produced by the moving pistons would have the effect of drawing a vacuum at the valve 70 which would not be so effective as the compression of air for this purpose.

What I claim is:—

1. A driving shaft, a driven shaft, means operated by relative movement between said shafts for compressing air, valves for controlling the circulation of air in the said compression means, a storage tank, a brake cylinder, a controlling valve communicating with the said compression means and with the brake cylinder and storage tank and atmosphere, said controlling valve having ports and adjustable to place the compression means in communication with the storage tank or the storage tank in communication with the brake cylinder, or the brake cylinder in communication with the atmosphere, or the compression means in communication with the atmosphere, or shut off the foregoing communication of the compression means with the other elements and cause air to be compressed in said compression means to a pressure sufficient to overcome the resistance of the driven shaft and make the latter revolve.

2. A driving member, a driven member, cylinders connected with one of said members, pistons in the cylinders and connected with the other member, valves for controlling the circulation of air in the cylinders, a storage tank, a brake cylinder, a controlling valve communicating with the respective cylinders and with the brake cylinder and storage tank and atmosphere, said controlling valve having ports and adjustable to place the cylinders in communication with the storage tank, or the storage tank in communication with the brake cylinder, or the brake cylinder in communication with the atmosphere, or the cylinders in communication with the atmosphere, or shut off the foregoing cylinder communication with the other elements and cause air to be compressed in said compression means to a pressure sufficient to overcome the resistance of the driven member and make the latter revolve, and means for stopping rotation of the cylinders and thereby stop revolution of the latter member.

In testimony whereof, I have hereunto set my hand at Detroit, Michigan, this 13th day of April, 1912.

FRANK MONROE PRATHER.

In presence of—
  R. C. HARGREAVES,
  M. H. DOHERTY.